United States Patent
Kwak et al.

(10) Patent No.: US 8,880,262 B2
(45) Date of Patent: Nov. 4, 2014

(54) SYSTEM AND METHOD FOR INCIPIENT DRIVE OF SLOW CHARGER FOR A VEHICLE WITH ELECTRIC MOTOR

(71) Applicant: Hyundai Motor Company, Seoul (KR)

(72) Inventors: Sang Hoon Kwak, Gyeonggi-do (KR); Jee Hye Jeong, Gyeonggi-do (KR); Dong Jun Lee, Incheon (KR); Gyu Yeong Choe, Gyeonggi-do (KR); Gun Soo Kang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/865,456

(22) Filed: Apr. 18, 2013

(65) Prior Publication Data

US 2014/0195081 A1 Jul. 10, 2014

(30) Foreign Application Priority Data

Dec. 28, 2012 (KR) .................. 10-2012-0155826

(51) Int. Cl.
*B60L 9/00* (2006.01)
*B60L 11/18* (2006.01)
*G06F 1/32* (2006.01)
*G06F 1/04* (2006.01)

(52) U.S. Cl.
CPC ........... *B60L 11/1824* (2013.01); *G06F 1/3203* (2013.01); *G06F 1/04* (2013.01); *Y02T 10/92* (2013.01); *Y10S 903/903* (2013.01)
USPC ........................ 701/22; 180/65.29; 903/903

(58) Field of Classification Search
CPC .............. Y02T 10/92; F02D 1/04; G06F 1/04; G06F 1/3203; G06F 11/604
USPC .......................... 701/22; 180/65.29; 903/903
See application file for complete search history.

(56) References Cited

U.S. PATENT DOCUMENTS 4,255,789 A * 3/1981 Hartford et al. .............. 701/108
4,980,836 A * 12/1990 Carter et al. .................. 713/322
5,767,636 A * 6/1998 Kanazawa et al. ............ 318/139

FOREIGN PATENT DOCUMENTS

| JP | 2009071897 A | 4/2009 |
| JP | 2009071899 A | 4/2009 |
| JP | 2009106053 A | 5/2009 |
| JP | 2011205840 A | 10/2011 |
| JP | 2011259658 A | 12/2011 |
| WO | 2012129104 A1 | 9/2012 |

* cited by examiner

*Primary Examiner* — Gertrude Arthur Jeanglaude
(74) *Attorney, Agent, or Firm* — Edwards Wildman Palmer LLP; Peter F. Corless

(57) ABSTRACT

Disclosed herein is a system and method for incipient drive of a slow charger for a vehicle. Specifically, an incipient drive entry of the slow charger used when a battery is charged in an electric vehicle (EV) or a plug-in hybrid electric vehicle (PHEV) may be performed. The method includes operating, by a controller, a regulator by outputting a control pilot (CP) signal from electric vehicle supply equipment (EVSE). Additionally, the method includes operating, by the controller, a flip-flop by outputting a driving signal from the regulator and operating a switching mode power supply (SMPS) by outputting a driving signal from the flip-flop. The method further includes resetting, by the controller, the flip-flop by outputting a reset signal from a central processing unit (CPU) turned on by the SMPS.

4 Claims, 2 Drawing Sheets

SYSTEM AND METHOD FOR INCIPIENT DRIVE OF SLOW CHARGER FOR A VEHICLE WITH ELECTRIC MOTOR

CROSS-REFERENCE

This application claims the benefit of Korean Patent Application No. 10-2012-0155826, filed on Dec. 28, 2012 in the Korean Intellectual Property Office, the disclosure of which is incorporated herein in its entirety by reference.

BACKGROUND OF THE INVENTION

1. Field of the Invention

The present invention relates to a system and method for incipient drive of a slow charger for an environment-friendly vehicle (e.g., a green vehicle), and more particularly, to a system and method for incipient drive of a slow charger, wherein incipient drive entry of the slow charger used when a battery is charged in an electric vehicle (EV) or a plug-in hybrid electric vehicle (PHEV) is performed.

2. Description of the Related Art

A slow charger is used in charging a battery for environment-friendly vehicles, such as an electric vehicle (EV) or a plug-in hybrid electric vehicle (PHEV).

According to the related art, a control pilot circuit which is a control circuit for operating the slow charger when the slow charger and electric vehicle supply equipment (EVSE) are connected. Furthermore, the control pilot circuit uses a relay or a real time clock (RTC) to perform a charging sequence. However, the relay or RTC used in the related art may lower the efficiency of the charging sequence due to a substantially high dark current, and the configuration of the control pilot circuit using the relay and RTC according to the related art is complex, and manufacturing cost thereof is substantially high.

SUMMARY

The present invention provides a system and method for incipient drive of a slow charger for an environment-friendly vehicle, wherein a control pilot circuit for incipient charge entry of the slow charger used when a battery is charged in a vehicle, may include a flip-flop to perform an incipient drive sequence for battery charging. A flip-flop or a latch may be a circuit having two stable states, wherein the states of the circuit are changed by signals applied to the circuit inputs.

According to an aspect of the present invention, a system for incipient drive of a slow charger for a vehicle, may include: a regulator configured to operate in response to a control pilot (CP) signal received from electric vehicle supply equipment (EVSE); a flip-flop configured to operate in response to a drive signal received from the regulator; a switching mode power supply (SMPS) configured to operate in response to a drive signal received from the flip-flop; and a central processing unit (CPU) configured to be turned on by the SMPS and to reset the flip-flop, wherein the CPU may be configured to apply a power latch signal to the SMPS before resetting the flip-flop to maintain power of the SMPS.

According to another aspect of the present invention, a method for incipient drive of a slow charger for a vehicle, may include: operating a regulator by outputting a control pilot (CP) signal from electric vehicle supply equipment (EVSE); operating a flip-flop by outputting a driving signal from the regulator; operating a switching mode power supply (SMPS) by outputting a driving signal from the flip-flop; and resetting the flip-flop by outputting a reset signal from a central processing unit (CPU) turned on by the SMPS.

BRIEF DESCRIPTION OF THE DRAWINGS

The above and other features and advantages of the present invention will become more apparent by describing in detail exemplary embodiments thereof with reference to the accompanying drawings in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will now be described more fully with reference to the accompanying drawings, in which exemplary embodiments of the invention are shown, so that one of ordinary skill in the art may easily embody the present invention.

The present invention relates to an incipient drive circuit of a slow charger for a green vehicle, wherein a control pilot circuit for incipient drive of the slow charger may include a flip-flop to simply the configuration of the drive circuit and decrease manufacturing cost compared to those of the related art and simultaneously decrease a dark current and increase efficiency of an incipient charging drive sequence of the slow charger.

Figure 1:
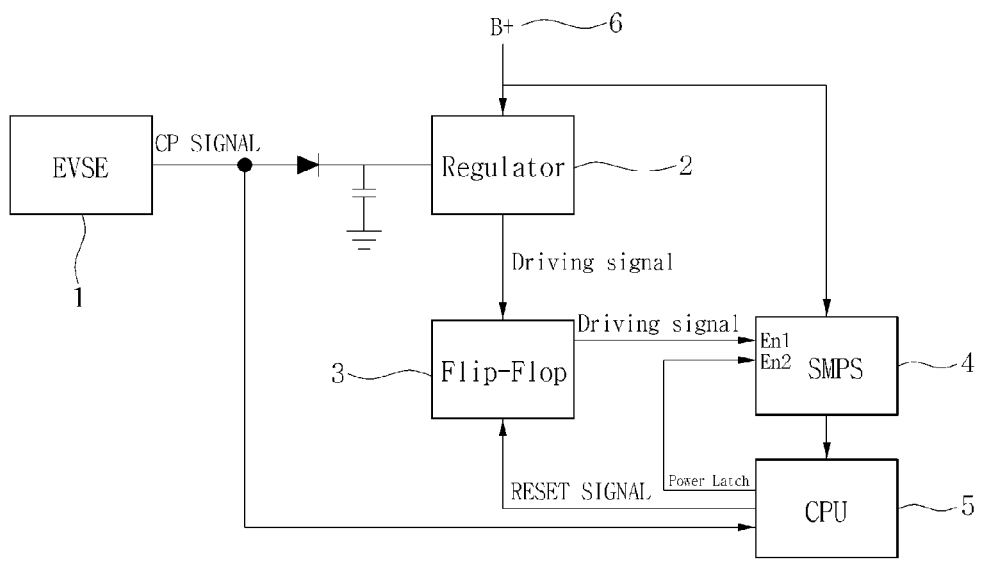
FIG. 1 illustrates an exemplary structure of a system for incipient drive of a slow charger for a green vehicle, according to an exemplary embodiment of the present invention.
Figure 2:
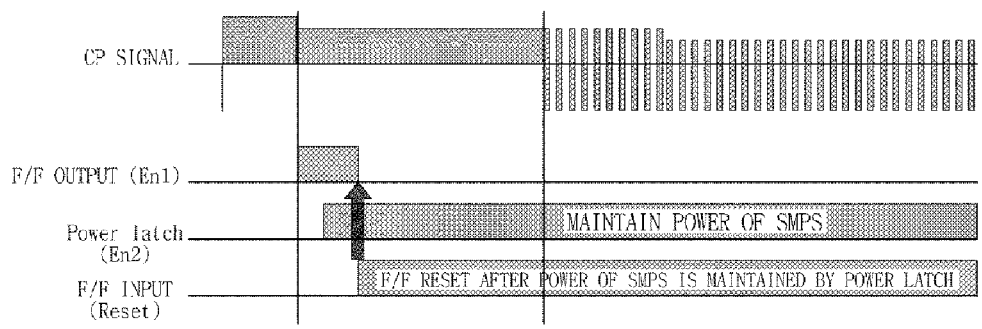
FIG. 2 illustrates an exemplary charging sequence of the system for incipient drive of the slow charger for the green vehicle illustrated in FIG. 1 according to an exemplary embodiment of the present invention.

FIG. 1 illustrates an exemplary control pilot circuit as an incipient drive circuit of a slow charger for a green vehicle, according to an exemplary embodiment of the present invention, and FIG. 2 illustrates an exemplary drive sequence when incipient charge entry of the slow charger is performed.

The incipient drive circuit of FIG. 1 is a control system configured to operate an incipient charging sequence of the slow charger for battery charging of the vehicle and may include a flip-flop 3 for an incipient drive sequence when a battery is charged.

The control pilot circuit may include a control circuit configured to operate the slow charger when the slow charger and electric vehicle supply equipment (EVSE) for the vehicle are connected. Thus, according to the present invention, the incipient drive circuit of the slow charger may have a simplified structure and a reduced manufacturing cost by using the flip-flop 3 to perform the incipient drive sequence when the battery is charged, such that the efficiency of the slow charger may be increased.

As illustrated in FIG. 1, the system for incipient drive of the slow charger for the green vehicle may include EVSE 1, a regulator 2, the flip-flop 3, a switching mode power supply (SMPS) 4, and a central processing unit (CPU) 5.

The flip-flop 3 may be configured to operate in response to an output signal received from the regulator 2 and supply an output signal to the SMPS 4 in response to a drive signal received from the regulator 2. The regulator 2 may be configured to operate in response to a control pilot (CP) signal received from the EVSE I and output a drive signal to the flip-flop 3. The regulator 2 may be driven in response to a signal received from an auxiliary battery 6.

As illustrated in FIG. 2, the CP signal may be a signal output from the EVSE 1 and rectified by a rectifier. The CP signal may be input to the regulator 2 and reduced to a predetermined magnitude by the regulator 2. The SMPS 4 configured to receive the drive signal from the flip-flop 3, may be driven in response to the signal received from the auxiliary battery 6 and apply a driving voltage to the CPU 5. In other words, the SMPS 4 may be configured to supply the driving voltage for driving the CPU 5 and operate in response to an output signal received from the flip-flop 3, thereby applying the driving voltage to the CPU 5.

As illustrated in FIG. 2, the CPU 5 may be configured to apply a power latch signal the SMPS 4 after being turned on by the output sign of the flip-flop 3 and operate the system of FIG. 1 to maintain the driving voltage to be supplied to the CPU 5. Subsequently, a reset signal may be applied to the flip-flop 3 to allow the flip-flop 3 to maintain an output of the flip-flop 3 in a substantially low state.

In other words, the CPU 5 may be configured to apply the power latch signal to the SMPS 4 after being driven by the flip-flop 3 and operate the system 1 of FIG. 1 to maintain the driving voltage and reset the flip-flop 3 to stop a drive signal in a substantially high state to be output to the SMPS 4 by the flip-flop 3.

In particular, after incipient drive of the CPU 5 is performed in response to the CP signal, the flip-flop 3 may be configured to be reset to maintain the output of the flip-flop 3 in a substantially low state. Thus, a dark current may be reduced compared to that of the related art, and the driving voltage of the CPU 5 may be maintained to control drive and drive stop of the slow charger can by the CPU 5.

Furthermore, after charging of the battery is completed using the slow charger, the dark current may be maintained at a reduced level compared to that of the related art. In addition, after charging is completed, when the CP signal of the EVSE 1 is maintained, the regulator 2 and the flip-flop 3 may operate. Thus, the dark current may be maintained at a substantially low level.

The CPU 5 of which power is maintained after incipient drive has been performed, may be configured to operate the system of FIG. 1 to output a charging current from the EVSE 1 when a signal is input to the EVSE 1, and charging of the battery may be performed by the charging current.

Figure 3:
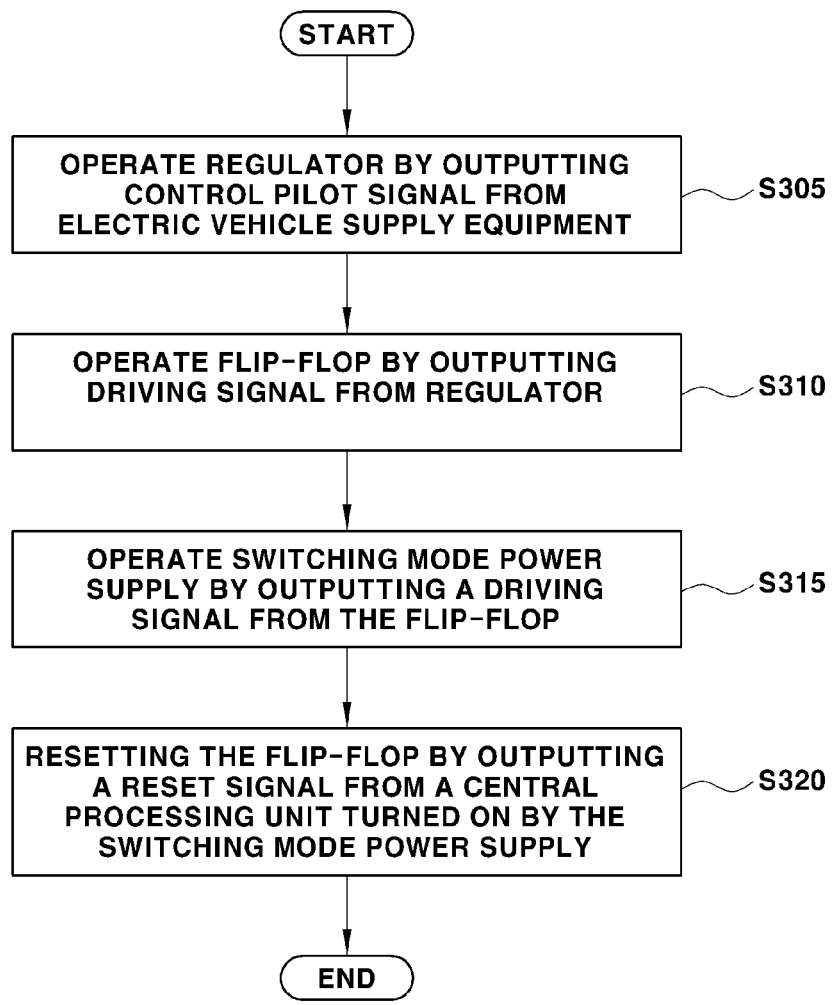
FIG. 3 illustrates an exemplary flow chart illustrating an exemplary method in relation to the exemplary embodiments of the present invention.

As shown in FIG. 3, the method for incipient drive of slow charger for a vehicle with electric motor may include operating, by a controller, a regulator by outputting a control pilot (CP) signal from electric vehicle supply equipment (EVSE) (S305); operating, by the controller, a flip-flop by outputting a driving signal from the regulator (S310); operating, by the controller, a switching mode power supply (SMPS) by outputting a driving signal from the flip-flop (S315); and resetting, by the controller, the flip-flop by outputting a reset signal from a central processing unit (CPU) turned on by the SMPS (S320).

The system for incipient drive of the slow charger for the green vehicle according to the present invention, may be capable of maintaining the stability and reliability of an incipient charging drive circuit by a simplified structure of the system, and an incipient drive time of the slow charger may be reduced by simplifying an incipient charging drive sequence by circuit simplification, and the size and weight of a charging control circuit for a vehicle, such as an electric vehicle (EV) or a plug-in hybrid electric vehicle (PHEV), may be reduced.

As described above, according to the present invention, a control pilot circuit may have a simplified configuration and a reduced manufacturing as cost compared to a control pilot circuit using a relay and a real time clock (RTC) according to the related art, and a dark current caused by the existing relay and RTC may be reduced and simultaneously, an incipient charging drive sequence of the slow charger may be effectively performed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A system for incipient drive of a slow charger for a vehicle, the system comprising:
    a regulator configured to operate in response to a control pilot (CP) signal received from electric vehicle supply equipment (EVSE);
    a flip-flop configured to operate in response to a drive signal received from the regulator;
    a switching mode power supply (SMPS) configured to operate in response to a drive signal received from the flip-flop; and
    a central processing unit (CPU) configured to be turned on by the SMPS and to reset the flip-flop, wherein the CPU is configured to apply a power latch signal to the SMPS before resetting the flip-flop to maintain power of the SMPS.

2. A method for incipient drive of a slow charger for a green vehicle, the method comprising:
    operating, by a controller, a regulator by outputting a control pilot (CP) signal from electric vehicle supply equipment (EVSE);

operating, by the controller, a flip-flop by outputting a
driving signal from the regulator;

operating, by the controller, a switching mode power supply (SMPS) by outputting a driving signal from the flip-flop; and resetting, by the controller, the flip-flop by outputting a reset signal from a central processing unit (CPU) turned on by the SMPS.

3. The method of claim 2, further comprising, apply, by the controller, a power latch signal to the SMPS before outputting the reset signal to maintain power of the SMPS.

4. A non-transitory computer readable medium containing program instructions executed by a processor or controller, the computer readable medium comprising:

program instructions that operate a regulator by outputting a control pilot (CP) signal from electric vehicle supply equipment (EVSE);

program instructions that operate a flip-flop by outputting a driving signal from the regulator;

program instructions that operate a switching mode power supply (SMPS) by outputting a driving signal from the flip-flop; and program instructions that reset the flip-flop by outputting a reset signal from a central processing unit (CPU) turned on by the SMPS.

* * * * *